Feb. 24, 1931.   A. F. SCHWENDNER ET AL   1,793,514
FLUID PRESSURE GOVERNING SYSTEM
Original Filed Sept. 8, 1924   5 Sheets-Sheet 1

Inventors
A.F. Schwender,
and J. S. Myers, Dec'd
by G. L. Myers, Exec.

BY
A. B. Reavis
ATTORNEY

WITNESS
E. Lutz

Feb. 24, 1931.   A. F. SCHWENDNER ET AL   1,793,514
FLUID PRESSURE GOVERNING SYSTEM
Original Filed Sept. 8, 1924   5 Sheets-Sheet 4

Inventors
A. F. Schwender,
and J. S. Myers, Dec'd
by G. L. Myers, Exec.

WITNESS
E. Lutz

BY
A. B. Reavis
ATTORNEY

Feb. 24, 1931. A. F. SCHWENDNER ET AL 1,793,514
FLUID PRESSURE GOVERNING SYSTEM
Original Filed Sept. 8, 1924   5 Sheets-Sheet 5

Patented Feb. 24, 1931

1,793,514

UNITED STATES PATENT OFFICE

ANTHONY F. SCHWENDNER, OF ESSINGTON, AND JOHN S. MYERS, DECEASED, LATE OF PHILADELPHIA, PENNSYLVANIA, BY GRACE L. MYERS, EXECUTRIX, OF PHILADELPHIA, PENNSYLVANIA, ASSIGNORS TO WESTINGHOUSE ELECTRIC & MANUFACTURING COMPANY, A CORPORATION OF PENNSYLVANIA

FLUID-PRESSURE GOVERNING SYSTEM

Original application filed September 8, 1924, Serial No. 736,660. Divided and this application filed October 7, 1927. Serial No. 224,631.

This application is a division of application Serial No. 736,660, filed September 8, 1924.

The present invention relates to governing systems, more particularly to governing systems wherein variable fluid pressure is used to control or actuate admission valves or other parts, and it has for its object to provide apparatus of the character designated which shall operate effectively and reliably, and which shall provide adequate variation in fluid pressure for operation of the valves upon change in the speed or other operating condition of the apparatus to be governed.

Another object is to provide a governing system which is particularly suitable where the admission valve or other apparatus to be controlled is at a remote distance from the speed responsive or equivalent control element.

The invention has for another object to provide a governing system for a prime mover which embodies a hydraulic actuating system which shall be extremely sensitive to the changes in the speed of the prime mover and which shall be capable of operating successively a plurality or series of admission valves in any desired sequence and in any desired overlapping relation.

The operation of motive fluid admission valves by hydraulic pressure systems has been generally recognized as providing a very effective method for controlling the speed of a prime mover. Such systems generally comprise a pump of the dynamic type which develops pressure in accordance with the scale of the speed and a pressure-responsive device for actuating the admission valve. The simplest form of pressure-responsive device is an abutment or piston subject to fluid pressure upon one side and to spring pressure upon the other side. However, with high fluid pressures, the spring becomes inordinately long and impractical, in order that sufficient pressures may be sustained and, at the same time, a sufficient range of movement permitted to permit of extreme sensitivity. Accordingly, it is the object of the present invention to provide apparatus which will give the requisite initial holding pressure and, at the same time, be extremely sensitive to very slight fluctuations from that pressure.

The present invention embodies a device for transforming fluid pressure having only slight variations, to a second fluid pressure having wide variations. This is accomplished by any suitable form of pressure transformer device, for example, by means of a valve member adapted to admit fluid from a source of fluid pressure to a pressure chamber or to exhaust fluid therefrom. Pressure-responsive means are arranged in communication with the pressure chamber, said means being adapted to interrupt the flow of fluid to or from said chamber upon definite movement thereof, whatever the position of the valve member. The valve member may be actuated by any suitable means from an outside source, several of which are illustrated and described in this specification. The pressure within the pressure chamber therefore varies with the position of the valve member and may be utilized to operate governing mechanism or other devices requiring a widely varying fluid pressure.

A particular embodiment of the invention comprises a pressure transforming device having a piston which is held against the initial fluid pressure generated in operation by a load spring. This piston is so arranged that small movements thereof are sufficient for permitting the hydraulic liquid to act upon a secondary piston controlled by a spring having a greater scale which permits of very substantial pressure changes for slight movements of the piston. In this manner, the variations in pressure are multiplied, that is, should the prime mover acquire a speed effective to produce an increase of 2 lbs. per square inch over a base pressure of 60 lbs., a total of 62 lbs. per square inch acts upon the primary piston, the 2 lbs. excess pressure being sufficient to move this piston a limited amount. This movement, however, is ample for causing a liquid under pressure to act upon the secondary piston effecting a like movement thereof which permits the accumulation of a pressure of, for example, 20 lbs., the latter pressure being proportional to the 2 lbs. or the amount of excess pressure acting upon the primary piston. The oil at the 20 lbs. pressure is discharged from the pressure transformer device and is conveyed to any well-known form of pressure-responsive device or, for larger units, to a novel form of motor for actuating the admission valve. This motor is so constructed that its movements are controlled by a spring which is subject to the widely fluctuating fluid pressures generated in the transformer device. An extraneous liquid having a substantial pressure and responsive to the pressure derived from the transformer device is employed as motive fluid for moving the admission valve in either direction. In this manner, the movements of the admission valve are positively controlled at all times and, when the admission valve is in a closed position, it is held upon its seat with such a preponderance of pressure as will avoid any possibility of leakage.

The employment of a hydraulic transmission system, such as above described, for controlling the admission of motive fluid to a prime mover in response to the speed thereof, is to be preferred over the frequently employed mechanical means inasmuch as the hydraulic system permits greater latitude in positioning the various elements with respect to each other. Furthermore, the hydraulic system of controlling is especially adapted for use with prime movers having a plurality of admission valves which it is desired to operate in sequence.

The above and other objects, which will be made apparent throughout the further description of the invention, are set forth in the following specification and illustrated in the accompanying drawings, in which.

Figure 1:
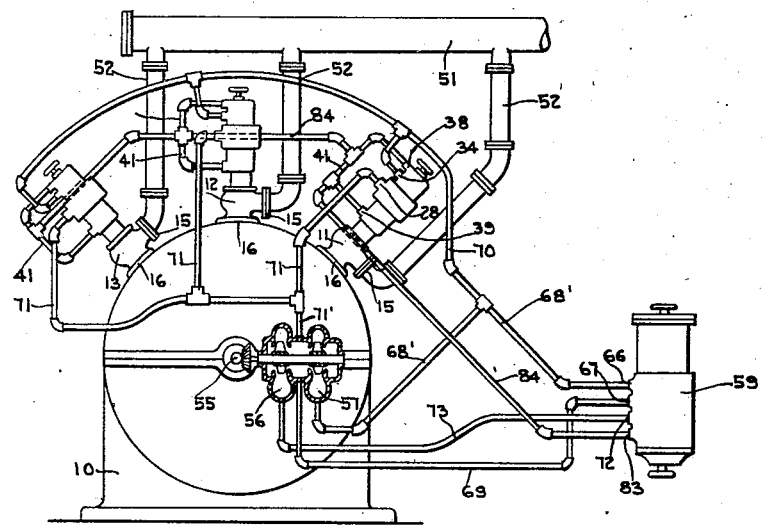
Fig. 1 is a diagrammatic arrangement of a prime mover equipped with primary, secondary and tertiary motive fluid admission valves which are actuated by one form of the hydraulic transmission system.
Figure 2:
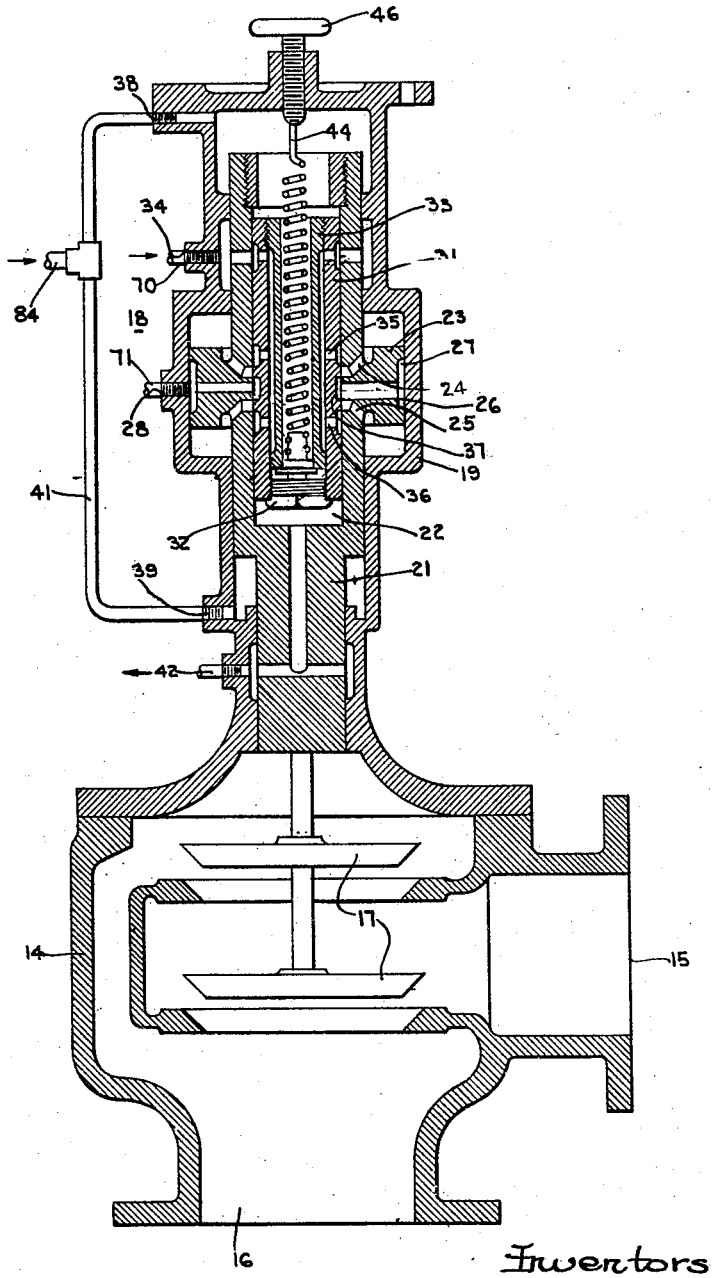
Fig. 2 is a sectional elevation of the valve motor employed in Fig. 1.

Referring to the drawings for a more detailed description of the invention, there is shown in Fig. 1 a prime mover 10, such as a steam turbine, provided with primary, secondary and tertiary motive fluid admission valves 11, 12 and 13, respectively. These valves, as shown to a larger scale in Fig. 2, comprise a body portion 14 having a motive fluid inlet connection 15 and a motive fluid outlet connection 16. Disposed within the valve body is a balanced valve disc 17 which is actuated by a motor 18 of novel construction. The valve motor 18 has a body portion 19 which is rigidly secured to the valve body 14. Disposed within the bore of the body portion 19 is a plunger 21 provided with a cylindrical interior 22 and an actuating piston 23. Actuating fluid inlet ports 24 and 25, which communicate, respectively, with opposite sides of the actuating piston 23, are provided in the plunger. Interposed between the inlet ports are discharge ports 26 which communicate, through a circular recess 27, with a connection 28 provided in the body portion 19 for the discharge of the actuating fluid.

Arranged within the hollow portion 22 of the plunger 21 is a hollow piston valve 31 for controlling the admission of actuating fluid to the opposite sides of the piston 23. The valve 31 is provided at one end with a fluid-tight plug 32. Fixed or secured concentrically within the piston valve 31 is a sleeve member 33 for conveying actuating fluid from an inlet port 34 provided in the body 19, through openings in the plunger 21 and the piston valve 31, to ports 35 and 36 provided in the piston valve 31. The latter ports distribute the fluid to the opposite sides of the piston 23, by cooperation with the ports 24 and 25. An exhaust port 37 formed by an annular recess is provided in the piston valve 31 for placing the respective ports 24 and 25 in communication with the discharge connection 28.

Located in the body portion 19 of the valve motor is an inlet 38 for permitting governing fluid to act upon the transverse face of the piston valve 31. An equalizing connection 39, which communicates through a conduit 41 with the governing fluid inlet 38, and a leak-off connection 42 are provided in the lower portion of the motor body for maintaining a balance of pressures between the oppositely-disposed transverse faces of the plunger 21. Movements of the piston valve 31 are controlled by a spring 44 which is maintained under an initial tension between the body portion 19 of the valve motor and the remotely-disposed end of the piston valve 31. The pressure of the liquid required to actuate the valve may, if desired, be altered by means of an adjusting screw 46. While the motor 18 has been described as actuating an admission valve, it is to be understood that its use is not confined solely thereto and that it may be employed for imparting a reciprocatory movement to innumerable forms of apparatus.

The motive fluid admission valves 11, 12 and 13 are supplied with steam, as shown in Fig. 1, by a common conduit 51 provided with branch conduits 52 which communicate respectively with the inlet connections 15 of the admission valves. The turbine 10 is provided with a rotor 55 which drives a pump 56 for generating a governing pressure and a pump 57 for generating a pressure sufficient to actuate the valve motor. The governor pump may be designed to maintain a hydraulic pressure of, for example, 60 lbs. per square inch when the prime mover is operating at its designed speed, while the pump 57 may be designed to generate a minimum pressure of 60 lbs. when the turbine is operating at its lowest speed. The pumps 56 and 57 discharge hydraulic fluid to a pressure transformer device 59.

Figure 3:
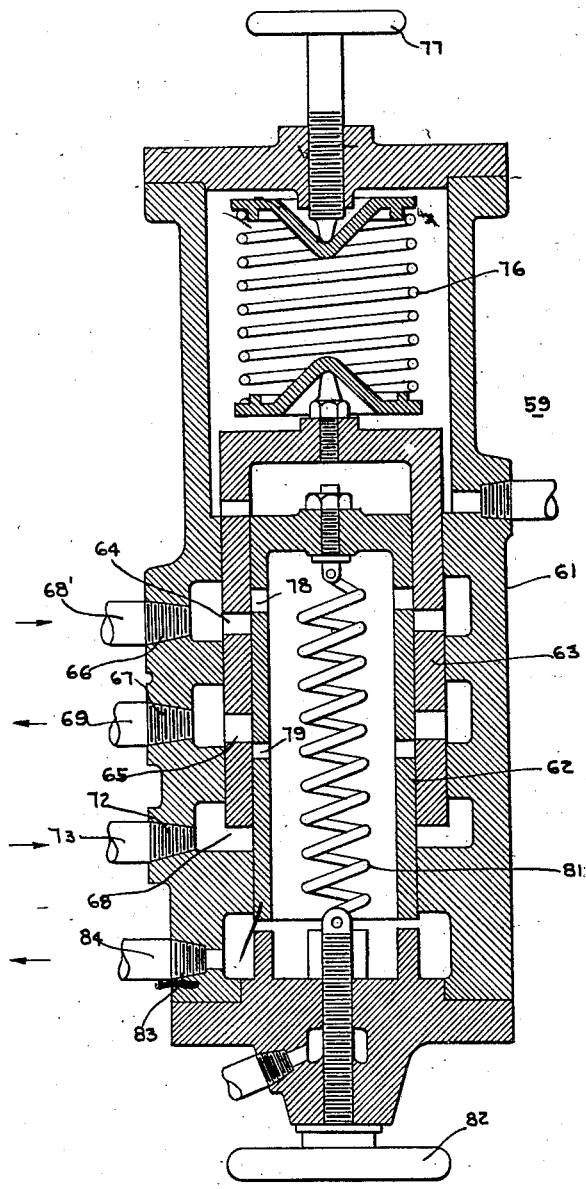
Fig. 3 is a sectional elevation of the pressure transformer employed in Fig. 1.

As shown in Fig. 3, the pressure transformer device comprises a body portion 61 having disposed therein cup-shaped inner and outer concentric piston valves 62 and 63. The outer piston valve 63 is provided with inlet and discharge ports 64 and 65 which communicate respectively with an actuating fluid inlet connection 66 and a discharge connection 67. The lower transverse face of the outer piston valve 63 is disposed in a chamber 68 provided with a governing fluid connection 72. The movements of the piston valve 63 are controlled by a load spring 76 which exerts a pressure sufficient to balance the hydraulic pressure acting upon the oppositely-disposed end of the piston valve. As this spring must withstand the base load generated by the governor pump, the scale is necessarily such as to permit of only limited movements of the outer piston valve 63 for slight fluctuations in pressure acting on the relatively small annular area of the lower end of the valve. The thrust of the hydraulic liquid acting upon the piston valve and the thrust exerted by the spring 76 may be equalized by adjustments of the screw 77. The inner piston valve 62 is provided with inlet ports 78 and outlet ports 79 which cooperate with the ports 64 and 65 provided in the outer piston valve to control the supply of hydraulic fluid to and the discharge of hydraulic fluid from the interior of the inner piston valve. The movements of the inner piston valve 62 are controlled by a spring 81 so proportioned that a predetermined pressure of liquid for any particular location of the piston is obtained. A speed changer 82 is provided for altering the setting of the spring 81. The pressure formulated within the inner piston valve 62 is conveyed through an outlet 83 and a conduit 84 to the governing fluid inlet ports 38 provided in the valve motors 18 of the respective admission valves 11, 12 and 13.

A conduit 68' connects the discharge of the actuating fluid pump 57 with the inlet connection 66 of the pressure transformer device while a conduit 69 is provided for returning the fluid to the pump. The conduit 68' is provided with a branch 70 which connects with the inlet port 34 of the respective valve motors for supplying fluid for actuating the valves, while branch conduits 71 and main conduit 71' are provided for returning the actuating fluid from the valve motors to the pump suction, the branch conduits 71 communicating with the discharge connections 28. The variable pressure of the liquid generated by the governor pump 56 is transmitted by a conduit 73 which connects with the connection 72 of the pressure transformer device. The pressure formulated within the transformer device is conveyed by a conduit 84 to the governing fluid inlet connections 38 provided in the respective valve motors.

The operation of the above embodiment of the invention is as follows: The rotations of the prime mover 10 actuate the hydraulic pressure pumps 56 and 57. The pump 56 generates a discharge pressure of, for example, 60 lbs. per square inch, the variations in speed of the prime mover effecting an increase or decrease from that pressure for governing purposes. As it is frequently desirable in prime movers of the high-speed type to confine the fluctuations in running speed within 3 per cent and as the resultant fluid pressure changes thus produced would be only 6 per cent, it may be readily appreciated that the fluctuations in the pressure of the governing fluid are rather limited. The pump 57 generates fluid pressure for actuating the valve motors 11, 12 and 13, the pressure produced being sufficient for operating the motors when the turbine is rotating at its lowest speed. The actuating fluid discharged by the pump 57 is conveyed by means of the conduit 68' to the actuating fluid inlet connection 66 provided in the pressure transformer device 59 and through a conduit 70 to the actuating fluid inlet ports 34 of the respective valve motors. Within the latter, the actuating fluid is confined within the annular chamber intervening between the sleeve member 33 and the piston valve 31.

The variations in pressure generated by the pump 56, which variations are in response to the speed of the prime mover, are conveyed by the conduit 73 to the governing fluid inlet connection 72 of the pressure transformer. Within the transformer, the governing pressure acts upon the annular, lower transverse face of the outer piston valve 63 and overcomes the force exerted by the load spring 76. As the load spring 76 must necessarily be designed to counteract the base pressure generated by the pump, that is, 60 lbs. per square inch, any variation from that pressure of one or two lbs. effects a small movement of the outer piston valve 63 within the housing.

Should this be an increase in pressure, the inlet port 64 is moved into communication with the inlet port 78 to permit the actuating fluid to enter the interior of the piston valve 62 and flow through the outlet 83 and conduit 84 to the governing fluid inlets 38 provided in the several valve motors. The amount of pressure created therein is controlled by the spring 81, which is of relatively greater scale, and which permits the accumulation of a predetermined pressure of liquid for any setting of the outer piston valve.

Upon accumulation of the latter pressure, which may, if desired, be 20 lbs. per square inch, the relative movement of the ports 78 of the inner piston valve and the ports 64 of the outer piston valve 63 cuts off the admission of further fluid.

The pressure of 20 lbs. per square inch thus formed acts upon the transverse area of the piston valve 31 and upon overcoming the force of the spring 44, moves the valve to permit the actuating fluid which is present in the distributing ports 35 to pass through the inlet ports 24 and act upon the upper face of the actuating piston 23, causing a downward movement of the piston 23 and consequently restricting the flow of motive steam through the valves 11, 12 and 13. At the same time the port 37 comes into communication with the ports 25, permitting the fluid beneath the actuating piston 23 to be discharged through the discharge ports 26 and the communicating conduits to the inlet of the pumps.

Any decrease in the pressure of the fluid generated by the governor pump 56 permits a lowering of the outer piston valve 63 and a return of a portion of the fluid through the discharge connection 67 and conduit 69 to the inlet of the pumps, until the pressure within the sleeve 62 has been reduced sufficiently to permit the spring 81 to move the sleeve 62 to close the ports 67. The reduced pressure acting upon the piston valve 31 of the motor permits the actuating liquid to move the piston 23 upwardly, thereby admitting additional motive fluid to the prime mover. The actuating fluid, which has been present on the upper face of the piston 23, is exhausted through the ports 35 and 37 and the discharge connection 28 to the conduits 71 and 71' for returning the same to the inlet of the pumps. While there may be, therefore, only a fluctuation of from 60 to 61 or 62 lbs. in the pressure generated by the governor pump, nevertheless, the transformer device is adapted for generating corresponding pressures of possibly 10 to 20 or 50 lbs., thereby increasing the differential pressure and producing very sensitive and accurate movements of the valve motors.

While the operation of the admission valves 11, 12 and 13 has been described as being in parallel, the hydraulic system of transmission lends itself especially to installations wherein it is desired to operate the primary, secondary and tertiary valves in sequence and in overlapping relation. This may be very easily accomplished by providing the springs 44 in the respective motors with such relatively different initial loadings that the opening of each successive valve precedes the closing of the prior valve, thus obtaining a non-interrupted and continuous flow of motive fluid to the prime mover. The respective springs may be accurately adjusted by means of the screws 46.

Referring to the pressure transformer 59, it will be noted that this device provides a pressure which is a function of the position of the outer piston valve 63. The pressure within the interior of the inner piston valve 62 is applied thereto in opposition to the force of the spring 81, and since the latter is held by a stationary member at one end, the position of the valve 62 is a function of the pressure therein. The ports 64 and 68 admit fluid pressure to the interior of the valve 62 and the ports 65 and 69 discharge fluid pressure therefrom in response to the relative position of the valves 62 and 63, so that the valve 62 assumes a position corresponding to that of the valve 63. Hence, the pressure within the valve 62 is a function of the position of the valve 63.

While the motive fluid admission valves 11, 12 and 13 have been illustrated as being operated by a novel form of fluid motor device, it is to be understood that there may be employed any well-known form of pressure-responsive device for actuating the valves. Furthermore, there may be employed only one pump, which pump shall generate fluid pressure for both governing and actuating purposes.

Figure 4:
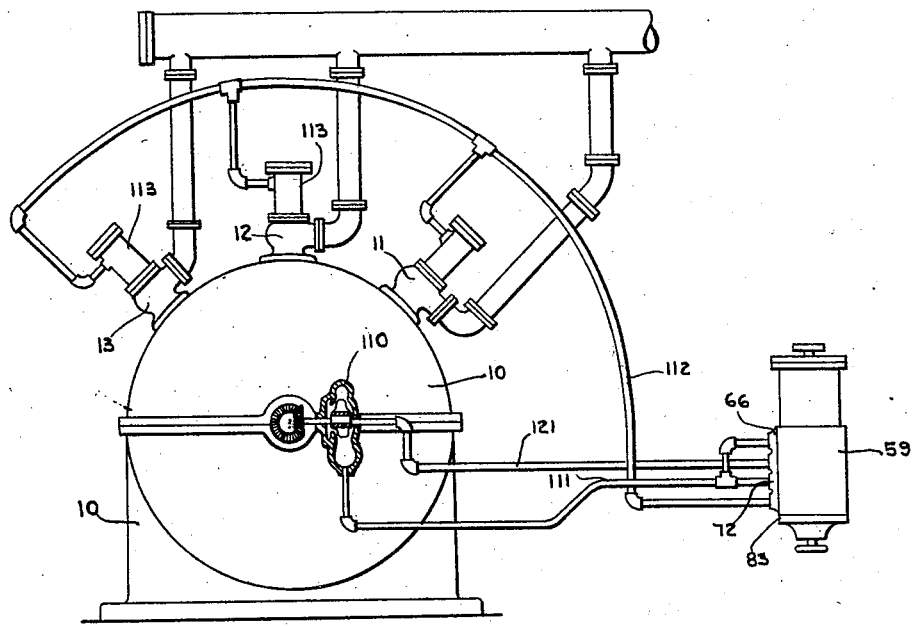
Fig. 4 is a diagrammatic arrangement of a prime mover having its motive fluid admission valves actuated by another form of the hydraulic transmission system.

As shown in Fig. 4, the prime move 10 is provided with a governor pump 110 and a pressure transformer device 59 which may be of the type illustrated in Fig. 3. The prime mover 10 is provided with the primary, secondary and tertiary motive fluid admission valves 11, 12 and 13 in the usual manner. The governor pump 110 may be designed to generate a pressure of 60 pounds when the turbine is operating at its lowest speed, any increase in speed resulting in the generation of a higher pressure. Fluid pressure discharged by the pump is conveyed by means of a conduit 111 to the actuating fluid inlet connection 66 and the governing fluid connection 72 of the pressure transformer device. The pressure transformer device multiplies the relatively small fluctuations in pressure which are effected by the governor pump in response to changes in speed of the prime mover in a manner heretofore described. The transformed or widely fluctuating pressure is then conveyed by means of a conduit 112 to a well-known form of pressure responsive device 113 for actuating the motive fluid admission valves.

Figure 5:
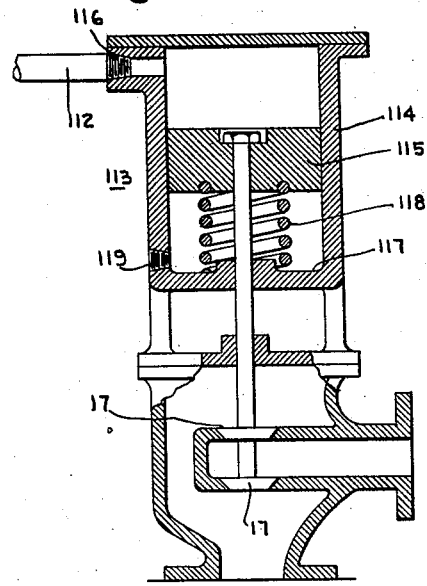
Fig. 5 is a sectional elevation of the valve and pressure-responsive device employed in Fig. 4.

The pressure-responsive device, as illustrated in Fig. 5, comprises a cylinder 114 having disposed therein a piston 115 which is connected to the balanced valve disc 17. Provided in the cylinder 115 and on one side of the piston is a connection 116 which communicates with the conduit 112. Interposed between the opposite face of the piston 115 and an abutment 117 is a spring 118 for opposing pressure of fluid acting upon the opposite face of the piston. A suitable leak-off connection 119 is provided.

With the above arrangement, the widely fluctuating fluid pressures generated in the transformer device 59 act directly upon the pistons 115 of the pressure-responsive mechanisms to control the admission of motive fluid to the prime mover. Fluid is returned from the transformer device 59 to the inlet of the governor pump 110 by a conduit 121. An arrangement such as above described is especially adapted for use with prime movers of smaller capacities, in which the fluid pressure generated by the governing pump is sufficient to act as motive fluid for moving the admission valves.

Figure 6:
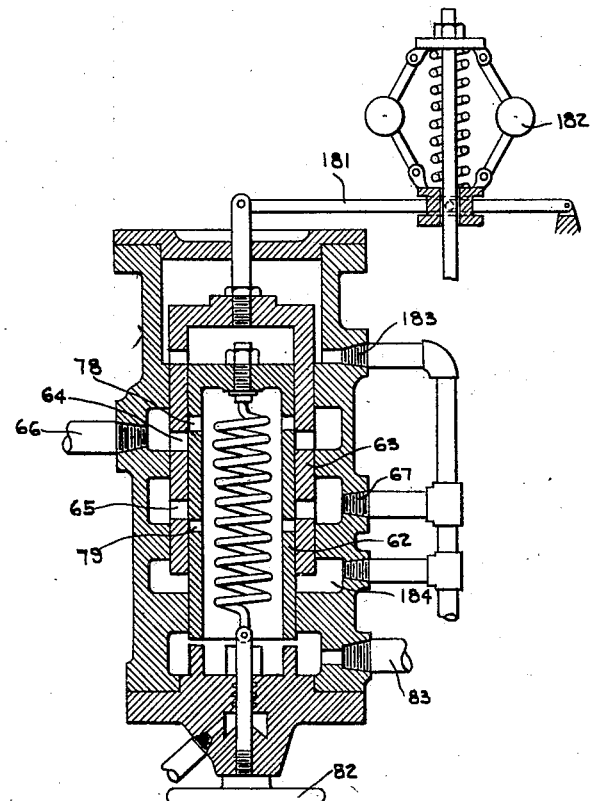
Fig. 6 is a sectional elevation of another embodiment of the pressure transformer which is suitable for mechanical actuations as by a centrifugal governor.

In Fig. 6 is shown an embodiment of a pressure control device, similar to the pressure transformer device, which may be operated mechanically as by a centrifugal governor. In this embodiment, the outer piston valve, instead of being actuated by fluid pressure, is moved mechanically through a lever 181 by a centrifugal governor 182 in response to the speed of the prime mover. Hydraulic fluid leak-off connections 183 and 184 are provided for permitting the outer piston to move freely within the transformer body. Movements of the outer piston valve control the admission and discharge of hydraulic fluid to the inner piston valve, which acts in a manner heretofore described to control the valve motors.

The hydraulic transmission system is therefore adapted for connecting the well-known form of mechanical governor to the motive fluid admission valve in lieu of the usual lever system, very small movements of the governor effecting substantial changes in the pressure of the hydraulic fluid controlling the movements of the admission valves. An arrangement such as this is very desirable in installations where the governor and the admission valve are arranged at a substantial distance apart from each other or, where a plurality of admission valves must be controlled. The mechanically operated pressure control device illustrated in Fig. 6 may be readily employed for manually controlling the movements of one or several prime movers from a remote distance such as the bridge of a ship, or, may be employed as a telemetric apparatus, its use not being confined solely to controlling the movements of prime movers.

In the different arrangements of hydraulic transmission systems heretofore described, there is employed a form of fluid pressure transformer device which produces substantial increases in fluid pressure for slight increases in pressure generated by the governor pumps. The device, however, may be readily adapted to provide a second fluid pressure varying as an inverse function of the fluid pressure generated by the governor pump; that is, to effect a substantial decrease in pressure in response to a slight increase in pressure which may be generated in the governing pump. A very advantageous feature of such an arrangement is that if the pressure of the governing fluid should fail, for any reason whatsoever, the pressure-responsive device closes the motive fluid admission valves.

Figure 7:
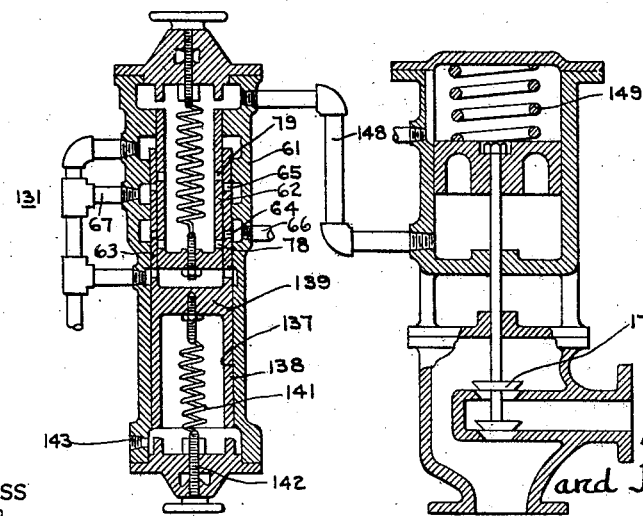
Fig. 7 is a sectional elevation of still another form of the hydraulic transmission system.

As illustrative in Fig. 7, there is shown a pressure transformer device 131, which is generally similar to the transformer devices illustrated in Figs. 3 and 6, but which provides a second fluid pressure varying as an inverse function of the fluid pressure controlling the pressure transformer. In this embodiment, the outer piston valve 63 is extended downwardly to provide a sleeve member 138 and a weight portion 139, both integral therewith. The casing 61 is also extended downwardly, forming a cylinder 137 in which the sleeve member 138 slides. Arranged within the sleeve member is a spring 141 which is connected at one end to the weight 139 and at its opposite end to an adjusting screw 142 which is provided in the cylinder. Located in the lower portion of the cylinder is a connection 143 for admitting fluid pressure generated by the governor pump. This fluid pressure enters the cylinder 137 and acts upon the transverse face of the sleeve member 138 and the weight portion 139, which thus form a pressure-responsive device for controlling the position of the piston valve 63. While, as mentioned heretofore, this pressure may fluctuate only one or two pounds, the pressure-responsive device may be so designed that the weight 139 substantially counteracts the base pressure generated by the pump, that is 60 pounds per square inch, or a portion thereof and the spring 141 may consequently be constructed of a relatively low scale.

Any increase in pressure results in an upward movement of the piston valve 63 permitting the ports 65 and 79 to cooperate to permit some of the actuating fluid to be released through the discharge pipe 67 to decrease the pressure within the interior of the piston valve 62. Any decrease in governing fluid pressure results in a downward movement of the pressure-responsive device and the piston valve 63, permitting the ports 64 and 78 to cooperate to admit additional actuating fluid to the interior of the inner piston valve 62 to increase the pressure therein. The pressure produced by the transformer device is conveyed by a conduit 148 to a form of motor device, as illustrated, in detail in Fig. 2, modified by inverting the same, or to the well-known form of pressure-responsive mechanism illustrated in Fig. 7. It will be noted that the latter is so arranged that upon failure of oil pressure, a spring 149 closes the admission valve, a very desirable feature in numerous installations.

Figure 8:
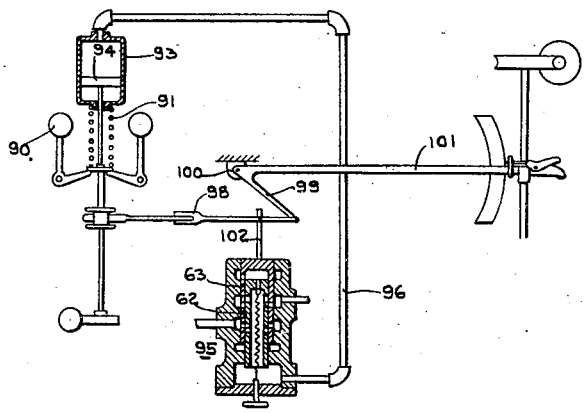
Fig. 8 is a diagrammatic arrangement of a form of governing system, in which the pressure transformer illustrated in Fig. 6 may be employed.

In Fig. 8, is shown another embodiment of the invention whereby a governor may be adjusted to control apparatus over a wide range of speeds with substantially a constant of low percentage of regulation. For example, a 400 lb. spring might be satisfactory for the governing of a 900 R. P. M. turbine, while an 800 lb. spring would be needed for the same turbine operating at a normal speed of 3000 R. P. M. This embodiment has for an object to associate the hydraulic transmission system with a centrifugal governor in such manner that a single spring may be employed in the governor for effectively controlling the admission of motive fluid at all operating speeds.

As illustrated, a centrifugal governor 90 is provided with a spring 91 and fluid-pressure means for opposing the centrifugal force of the governing weights. The fluid-pressure means may comprise a cylinder 93 and a piston 94 and the amount of fluid pressure admitted to or discharged from the cylinder 93 is controlled by a pressure transformer device 95, similar to that illustrated in Fig. 6. A conduit 96 is provided for transmitting fluid pressure between the cylinder 93 and the pressure transformer device 95. With the above arrangement, the force exerted by the spring 91 is supplemented with fluid at the necessary pressure. The transformer device may be set manually by a suitable lever mechanism. The lever mechanism shown comprises a telescopically extensible lever 98 which is secured to a movable portion of the governor and is pivoted, at its opposite end, to a bell-crank 99, pivoted at 100, which is moved by a speed-changing lever 101. The lever 98 is secured, by a sliding connection, to a rod 102 for actuating the outer piston valve 63 of the pressure transformer device.

With this system of control, a change in the setting of the speed-changing lever 101 effects a displacement of the inner and outer piston valves relative to the valve body, thereby changing the spring load and incidentally the pressure of the fluid which is maintained in the cylinder 93. However, it is not only necessary to produce, what may be termed in effect, a change in the base load of the spring, but it is also necessary to change the scale of the spring. Accordingly, upon a movement of the speed-changing lever 101 in either direction, the lever 98 is displaced by the bell-crank 99 and the proportional lengths of the arms of the lever 98 are altered. As a result of this alteration, the extent of the movement imparted to the outer piston valve 63 by movement of the governor is increased or decreased, thereby altering the pressure of the fluid acting upon the piston 94. With the above arrangement, a setting of the speed-changing device accomplishes both a change in the initial or base pressure prevailing within the cylinder 93 and also effects such alterations in fluid pressure as may be accomplished by changing the scale of the spring. A single governor spring may therefore be employed to effectively govern the prime mover at any number of desired speeds, thereby accomplishing similar results to those obtained with the use of several springs having different proportions.

While this invention has been shown in several forms, it will be obvious to those skilled in the art that it is not so limited, but is susceptible of various other changes and modifications, without departing from the spirit thereof, and it is desired, therefore, that only such limitations shall be placed thereupon as are imposed by the prior art, or as are specifically set forth in the appended claims.

What is claimed is:

1. In a fluid-pressure operated governing system for a prime mover having a plurality of motive fluid admission valves, the combination of a plurality of motor devices for regulating and actuating said admission valves, a pressure transformer regulating the motor devices, means for developing governing fluid pressure varying as a function of the speed of the prime mover for controlling the pressure transformer, and means providing for actuating fluid pressure for the motor devices.

2. In a fluid-pressure operated system, the combination of means for developing governing fluid pressure, a pressure transformer responsive to changes in the pressure of the governing fluid for developing a relatively greater fluctuating fluid pressure, a motor device responsive to the last-mentioned fluid pressure, and means for developing fluid pressure for actuating the motor device.

3. The combination with a prime mover having a motive fluid admission valve, of means responsive to the speed of the prime mover for developing a governing fluid pressure, a pressure transformer responsive to changes in the pressure of the governing fluid for developing a widely varying fluid pressure, a motor device for the admission valve, the movements of said motor device being responsive to the last-mentioned fluid pressure, and means for developing fluid pressure for actuating the motor device.

4. In a governing system for a prime mover, the combination of means providing a fluid pressure varying as a direct function of the speed of the prime mover, means including a pressure transformer for providing a second fluid pressure varying as an inverse function of the first fluid pressure, the second fluid pressure being controlled solely by said pressure transformer, the latter being responsive to the first-mentioned fluid pressure and acting in response to the second fluid pressure to control the same, a valve for said prime mover, and means for applying said second fluid pressure to actuate said valve in an opening direction.

5. In a governing system for a prime mover, the combination of means providing a fluid pressure varying as a direct function of the speed of the prime mover, means providing a second fluid pressure responsive to and varying as an inverse function of the first fluid pressure, a valve for said prime mover, and means for actuating said valve in response to said second fluid pressure.

6. In a governing system for a prime mover, the combination of means providing a fluid pressure varying as a direct function of the speed of the prime mover, means providing a second fluid pressure responsive to and varying as an inverse function of the first fluid pressure, a valve for said prime mover, and means or actuating said valve in opening direction in response to increase in said second fluid pressure and in closing direction in response to decrease therein.

7. In a governing system for a prime mover, the combination of an impeller pump developing a fluid pressure varying with the speed of the prime mover, a pressure-transformer responsive to said fluid pressure and providing a second fluid pressure having greater variations than the first fluid pressure, valves for said prime mover, a plurality of motor devices for actuating said valves, each motor device having a pressure-responsive device, and means for adjusting each of said pressure-responsive devices.

8. The combination defined in claim 7, and means for adjusting the pressure transformer.

9. In a governing system for a prime mover, the combination of means developing a fluid pressure varying as a function of the speed of the prime mover, means including a pressure transformer for providing a second fluid pressure varying in response to variations in the first-mentioned fluid pressure, the second fluid pressure being controlled solely by said pressure transformer, the latter being responsive to the first-mentioned fluid pressure and acting in response to the second fluid pressure to control the same, and a motor device responsive to said second fluid pressure.

10. In a governing system for a prime mover, the combination of an impeller pump for developing a fluid pressure varying as a function of the speed of the prime mover, means including a pressure transformer for providing a second fluid pressure varying in response to variations in the first-mentioned fluid pressure, the second fluid pressure being controlled solely by said pressure transformer, the latter being responsive to the first-mentioned fluid pressure and acting in response to the second fluid pressure to control the same, and a motor device responsive to said second fluid pressure.

11. In a governing system for a prime mover, the combination of an impeller pump for developing a fluid pressure varying as a function of the speed of the prime mover, means providing a second fluid pressure varying in response to variations in the first-mentioned fluid pressure, the variations in said second fluid pressure being of greater magnitude than the variations in the first-mentioned fluid pressure, and a motor device responsive to said second fluid pressure.

12. In a governing system for a prime mover, the combination of means developing a fluid pressure varying as a function of the speed of the prime mover, means providing a second fluid pressure varying in response to variations in the first-mentioned fluid pressure, the ratio of operating range of variation to maximum pressure being greater in the second fluid pressure than in the first-mentioned fluid pressure, and a motor device responsive to said second fluid pressure.

13. In a governing system for a prime mover, the combination of means providing a fluid pressure varying as a function of the speed of the prime mover, means providing a second fluid pressure varying in response to variations in the first-mentioned fluid pressure, the variations in said second fluid pressure being of greater magnitude than the variations in the first-mentioned fluid pressure, and a motor device responsive to said second fluid pressure.

In testimony whereof, we have hereunto subscribed our names this 28th day of September, 1927.

ANTHONY F. SCHWENDNER.
Mrs. GRACE L. MYERS,
*Executrix of the Estate of John S. Myers, Deceased.*